United States Patent
Fukano et al.

(10) Patent No.: US 6,244,762 B1
(45) Date of Patent: *Jun. 12, 2001

(54) PRINTING APPARATUS, METHOD OF CONTROLLING IT AND STORAGE MEDIUM

(75) Inventors: Kazuko Fukano, Matsumoto; Hidetake Mochizuki, Azusagawa-mura; Naohiko Koakutsu, Shiojiri, all of (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,058
(22) PCT Filed: Nov. 25, 1998
(86) PCT No.: PCT/JP98/05314
 § 371 Date: Jul. 22, 1999
 § 102(e) Date: Jul. 22, 1999
(87) PCT Pub. No.: WO99/27436
 PCT Pub. Date: Jun. 3, 1999

(30) Foreign Application Priority Data

Nov. 25, 1997 (JP) ................................................ 9-323006
Nov. 17, 1998 (JP) ............................................... 10-326819

(51) Int. Cl.$^7$ .......................................................... B41J 3/42
(52) U.S. Cl. ................................. 400/70; 400/76; 400/61
(58) Field of Search .................................. 400/70, 76, 61

(56) References Cited

U.S. PATENT DOCUMENTS

| | | | |
|---|---|---|---|
| 5,823,690 | * 10/1998 | Narushima et al. | 400/120.07 |
| 5,868,505 | * 5/1999 | Narushima et al. | 400/120.09 |
| 5,906,442 | * 5/1999 | Kishida | 400/61 |

FOREIGN PATENT DOCUMENTS

| | | |
|---|---|---|
| 3-140279 | 6/1991 | (JP) . |
| 3-258577 | 11/1991 | (JP) . |
| 6-314202 | 11/1994 | (JP) . |
| 7-57481 | 3/1995 | (JP) . |
| 7-64735 | 3/1995 | (JP) . |
| 7-314798 | 12/1995 | (JP) . |
| 7-334327 | 12/1995 | (JP) . |
| 2593844 | 12/1996 | (JP) . |
| 9-6551 | 1/1997 | (JP) . |
| 9-282302 | 10/1997 | (JP) . |

* cited by examiner

Primary Examiner—John S. Hilten
Assistant Examiner—Charles H. Nolan, Jr.
(74) Attorney, Agent, or Firm—Mark P. Watson

(57) ABSTRACT

According to the present invention, a printer apparatus connected to a host computer, in such a manner that permits bidirectional communication, has a nonvolatile memory that allows its contents to be rewritten and read from the host computer. Allocated to the nonvolatile memory is an area for retaining a plurality of types of information for identifying the printer apparatus. Each piece of information comprises a key for identifying the type of information and a terminator indicating the end of the information. Thus, efficiently storing a plurality of pieces of information regarding the printer apparatus in the nonvolatile memory permits flexible change or addition of information.

92 Claims, 8 Drawing Sheets

(A) KEY + INFORMATION + TERMINATOR
    (kn)                  (00H)

(B) K1    EPSON    <NULL>
    ‿‿‿   ‿‿‿‿‿    ‿‿‿‿‿‿
    KEY    DATA   TERMINATOR (C) 4BH 31H  45H 50H 53H 4FH 4EH  00H
    ‿‿‿‿‿‿‿  ‿‿‿‿‿‿‿‿‿‿‿‿‿‿‿‿‿‿‿  ‿‿‿
      KEY              DATA       TERMINATOR

| information | |
|---|---|
| manufacture's name | ASCII : K 1 E P S O N <NULL><br>hexa-decimal : 4BH 31H 45H 50H 53H 4PH FFH 00H |
| model name | ASCII : K 2 S E - C 1 9 8 8 I I <NULL><br>hexa-decimal : 4BH 32H 53H 45H 2DH 43H 31H 39H 38H 38H 49H 49H 00H |
| serial No. | ASCII : K 3 3 B 2 0 0 2 2 9 3 3 <NULL><br>hexa-decimal : 4BH 33H 33H 42H 32H 30H 30H 32H 32H 39H 33H 33H 00H |

(A)  KEY + SW1 SET VALUE + SW2 SET VALUE +. . . + TERMINATOR
     (K4)                                              (00H)

(B)  0 1 x x x x x x (C)  4BH  34H  40H  40H  40H  00H

KEY       SW1  SW2  SW3 TERMINATOR (D)  K 4 @ @ @ <NULL>

| K | 1 | E | P | S | O | N | <Null> | K | 2 | S | E | - | C | 1 | 9 |
|---|---|---|---|---|---|---|---|---|---|---|---|---|---|---|---|
| 8 | 8 | I | I | <Null> | K | 3 | 3 | B | 2 | 0 | 0 | 2 | 2 | 9 | 3 |
| 3 | <Null> | K | 4 | @ | @ | @ | <Null> | | | | | | | | |

PRINTING APPARATUS, METHOD OF CONTROLLING IT AND STORAGE MEDIUM

BACKGROUND OF THE INVENTION

1. Technical Field

The present invention relates to a printer apparatus connected to a host device in such a manner that bidirectional communication is possible, and more particularly, to a printer apparatus having a nonvolatile storage such as a flash memory, and a control method and an information recording medium for the same.

2. Background Art

Hitherto, some electronic devices including printer apparatus have stored information specific to the electronic device in built-in nonvolatile memories.

Japanese Unexamined Patent Publication No. 7-64735 discloses a printing device which is connected to a network and which stores the printer-specific configuration information transmitted from a host in a nonvolatile memory and returns information regarding the printer configuration stored in the nonvolatile memory to the host in response to an inquiry command from the host.

Further, Patent Gazette No. 2593844 discloses an electronic device having a nonvolatile memory built therein, and the nonvolatile memory has an apparatus information area for storing data specific to the apparatus, data being written to and read from the outside.

However, in the printing device disclosed in Japanese Unexamined Patent Publication No. 7-64735, the data of printer configuration information is stored in a predetermined block, i.e. data of a limited size from a predetermined address, allocated to the nonvolatile memory beforehand, and is read from the predetermined block, posing a problem in that it is impossible to rewrite or read a part of the information. For instance, in order to rewrite a part of the information, a host must read all the information stored in the predetermined block of the nonvolatile memory, edit the information, and write it back to the nonvolatile memory, thus making the processing complicated and taking a lot of time to complete the processing if the amount of information is large.

In the electronic device disclosed in patent gazette No. 2593844, apparatus-specific data is written to the area of a fixed capacity allocated to the nonvolatile memory in advance, presenting a problem in that a certain amount of memory is occupied regardless of the length of data to be actually stored, with consequent poor efficiency of utilization of the memory. For example, the information regarding the name of a manufacturer significantly varies in the length of data thereof, depending on each manufacturer, and it is necessary therefore to allocate a maximum width to the nonvolatile memory in advance, undesirably resulting in a large wasteful memory area.

Accordingly, an object of the present invention is to solve the problems with the conventional arts set forth above and to efficiently store a plurality of pieces of printer apparatus information in a nonvolatile memory to permit flexible change, addition, and readout of the information.

SUMMARY OF THE INVENTION

To solve the aforesaid problems, a printer apparatus in accordance with the present invention is connected to a host device and performs printing based on commands and data from the host device, the printer apparatus having nonvolatile storage capable of retaining stored contents even in a state when no power is supplied to the printer apparatus, data storing means for storing the data received following a first command in the nonvolatile storage in response to the first command from the host device, and data reading means for reading data stored in the nonvolatile storage in response to a second command from the host device and transmitting it to the host device, wherein the data storing means stores data in an amount specified by the first command at an address in the nonvolatile storage specified by the first command.

The data reading means reads and sends the data in an amount specified by the second command from an address in the nonvolatile storage specified by the second command.

With this configuration, the host device is able to store the individual information or management information regarding a printer apparatus in the printer apparatus itself and to read it from the printer apparatus to use it when the power of the printer apparatus is turned back on, thus permitting easy management of the printer apparatus. Even if, for example, the printer apparatus is replaced, the state of the printer apparatus can be easily ascertained so as to conduct proper printing control by reading the individual information or management information regarding the printer apparatus. It is also possible to store the management information regarding each host device when a plurality of host devices are connected.

In this case, if predetermined data is found among data to be stored, the data storing means may abort storing data following that data. This enables the host devices to store a required amount of data without the need for carrying out complicated processing for accurately knowing the amount of data to be stored, thus permitting easier processing.

In the case mentioned above, if a so-called "page mode", in which mode the contents of the print buffer are printed, wherein a predetermined amount of print data received from the host device is expanded into a print buffer accommodating a plurality of lines it is desirable that the data storing means does not store the data.

If an address or a data amount specified by a data write command or a data read command is not valid, then it is desirable that the data storing means does not store the data. In these cases, there is a danger in that proper information exchange with the host device cannot be implemented and it is very likely that invalid data causes the host device to malfunction.

Preferably, a code specified by the data write command is compared with a code specified by the data read command, and the data reading means reads and transmits stored data only if the codes agree with each other. This makes it possible to disable unauthorized access to data stored.

Preferably, the nonvolatile storage is provided with a plurality of areas so that it is possible to disable storing and reading of the data in at least one area. This enables protection of important data. For instance, the data managed by a manufacturer is stored in the area that permits write/read protection so as to disable access by a user.

A printer apparatus in accordance with the present invention is connected to a host device to perform printing on the basis of commands and data from the host device, and has nonvolatile storage capable of retaining stored contents even in a state when no power is supplied to the printer apparatus, the nonvolatile storage having an area for storing information which is composed of a plurality of types of information for identifying a printer apparatus and which has a key for identifying the type of information and a terminator indicating the end of the information. The key is characterized in that it is positioned at the initial address of the area of the nonvolatile memory or immediately following the terminator. This makes it possible to efficiently store characteristic information or setting information regarding the printer apparatus in the nonvolatile storage.

The printer apparatus in accordance with the present invention has data storing means for storing, in response to a first command from a host device, the data received following the first command in a nonvolatile storage, and data reading means for reading data stored in the nonvolatile storage, in response to a second command from the host device, and transmitting it to the host device, wherein the data storing means stores a key specified by the first command, data in an amount specified by the first command, and a terminator in the nonvolatile storage. This enables the host device to easily store data without performing address management in the nonvolatile storage.

In this case, preferably, first key-searching means is provided for searching for a key specified by the first command in the area of the nonvolatile storage, and the data storing means deletes data from the key to the terminator according to the first key-searching means and stores the key, data, and the terminator. This enables prevention of a problem in which there are a plurality of data having the same key.

Preferably, information rearranging means is provided for rearranging the placement of information stored in the area of the nonvolatile storage, and if data has been deleted by the data storing means, the placement of the data stored behind the deleted data is rearranged on the basis of the amount of the deleted data. This makes it possible to efficiently store data in the nonvolatile storage.

Preferably, the data storing means stores a key, data, and a terminator immediately following the last terminator among the terminators stored in the area of nonvolatile storage. This permits easy searching of a key.

Preferably, if predetermined data is found among data to be stored, then the data storing means aborts storing data after that data.

Preferably, if the so-called "page mode" has been selected, then the data storing means does not store data.

Preferably, first data-amount verifying means is provided for determining whether the amount of data specified by the first command is valid, and the data storing means does not store data if the amount of data is not valid, according to the first data-amount verifying means.

A printer apparatus in accordance with the present invention is characterized in that it has a second key-searching means for searching a key specified by a second command in the area of a nonvolatile storage, and data reading means reads and sends data between the key and a terminator according to the second key-searching means. This enables a host device to easily read data without the need to perform address management in the nonvolatile storage.

In this case, it is preferable that, if no data exists between a key and a terminator, the data reading means sends information to that effect. It is also preferable that, if a specified key does not exist, a message to that effect is sent. It is also preferable that, if no terminator exists, the data reading means sends information to that effect. Preferably, if predetermined data is found among read data, the data reading means sends information to that effect. This enables the host device to recognize a read error and to further identify the cause of the error.

A printing apparatus in accordance with the present invention has data deleting means for deleting data stored in a nonvolatile storage according to a third command from a host device, and third key-searching means for searching for a key specified by the third command in the area of the nonvolatile storage, wherein the data deleting means deletes data from a key to a terminator according to the third key-searching means. This enables the host device to easily delete data that is no longer necessary.

In this case, it is preferable that information rearranging means for rearranging the placement of information stored in the area of the nonvolatile storage is provided, and when data has been deleted by the data deleting means, the placement of data stored behind the deleted data is rearranged according to the amount of the deleted data. This enables stored data to be efficiently disposed in the nonvolatile storage.

Preferably, when the so-called "page mode" has been selected, the data deleting means does not delete data.

The printing apparatus in accordance with the present invention is characterized in that it has occupied-capacity detecting means for detecting and sending an occupied capacity indication of the area of the nonvolatile storing means in response to the third command from the host device. The printing apparatus is also characterized in that it has remaining-capacity detecting means for detecting and sending a remaining capacity indication of the area of the nonvolatile storage in response to a fourth command from the host device. The printing apparatus is also characterized in that it has area-capacity transmitting means for transmitting the capacity of the area of the nonvolatile storing means in response to a fifth command from the host device. With this configuration, the host device can easily know the availability of the nonvolatile storage.

In the case set forth above, it is preferable that a code specified by a data write command is compared with a code specified by a data read command, and data reading means reads and sends stored data only if the codes coincide with each other. This disables an unauthorized access to stored data.

Preferably, the nonvolatile storage is provided with a plurality of areas so as to disable storing and reading of data in at least one area. This permits protection of important data. For instance, the data managed by a manufacturer is stored in the area that permits write/read protection so as to disable access by a user.

The present invention can also be applied to a control method for the printer apparatus, and the same operation and advantages can be obtained.

The control method in accordance with the present invention can be supplied as a control program that can be implemented on a control unit, or can be provided through a recording medium in which the control program has been recorded. As the recording medium, a compact disc (CD-ROM), a floppy disk, a hard disk, a magneto-optical disk, a digital video disc (DVD-ROM), or a magnetic tape may be employed. By using these recording media, the programs can be introduced into an existing printer apparatus. Further, these programs can be registered in a WWW (World Wide Web) web site so that a user may download them to introduce the programs into an existing printer apparatus.

BRIEF DESCRIPTION OF DRAWINGS

FIG. 7 is a diagram conceptually illustrating the mapping of the characteristic information and setting information regarding the printer apparatus in the printer information area.

DETAILED DESCRIPTION

The following will describe the embodiments of the present invention in conjunction with the accompanying drawings.

Figure 1:
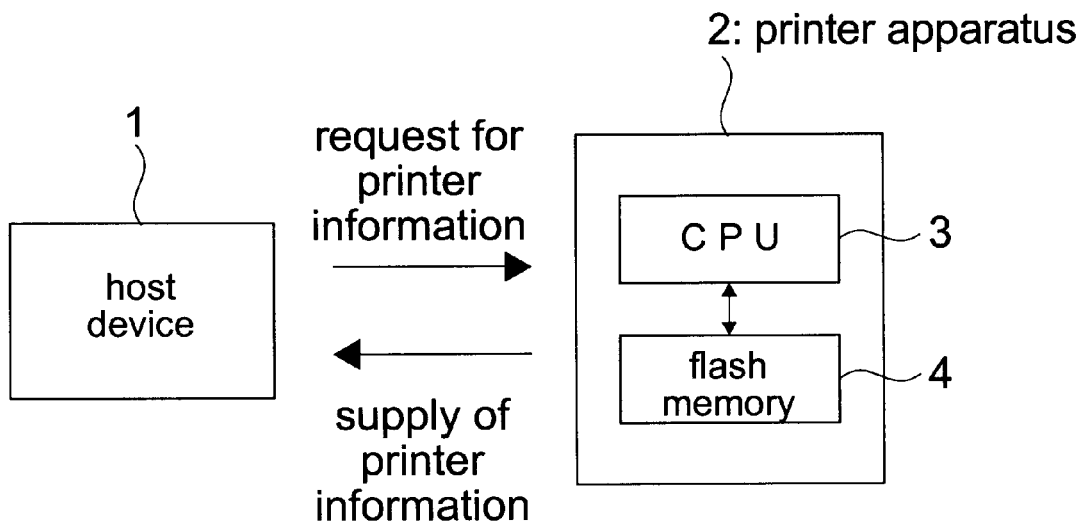
FIG. 1 is a block diagram conceptually illustrating data exchange between a printer apparatus in accordance with the present invention and a host device.

FIG. 1 is a block diagram conceptually showing the data exchange between a printer apparatus in accordance with the present invention and a host device. In the drawing, a host device 1 and a printer apparatus 2 are connected via an interface such as RS232, Centronics, etc. The host device 1 and the printer apparatus 2 mutually exchange data according to a preestablished protocol via the interface.

The printer apparatus 2 comprises a CPU 3, which controls the entire system thereof, and a flash memory 4. The flash memory 4 is a nonvolatile memory that allows data to be electrically erased and rewritten on a block basis. Based on a control command from the host device 1, the CPU 3 reads data from and writes data into the flash memory 4 and sends the results back to the host device 1.

In the present invention, the flash memory 4 has an area for retaining the characteristic information regarding the printer apparatus 2 (hereinafter referred to as "printer information area"). Examples of the characteristic information to be retained in the printer information area include the identification number, the model number, the firmware version, the manufacturer's name, the manufacturer's serial number, the manufacture date, the delivery date, maintenance information (the history of the product and the history of repair), the person in charge of management, etc. of the printer apparatus 2. It is also possible to store various types of setting information of the printer apparatus 2 (e.g. the setting of paper width, the setting of the number of columns that can be printed per line, the setting of communication speed, the setting of the presence of an optional function, etc.) in the printer information area.

A user can obtain various types of information stored in the foregoing printer information area by sending out a predetermined read command from the host device 1. The user can also store various types of information in the foregoing printer information area by sending out a predetermined write command from the host device 1. If it is not desirable that the user rewrite various types of information regarding the printer apparatus 2, then the rewriting may be enabled only when the printer apparatus 2 is in a predetermined mode. It is also possible to manage the flash memory 4 by dividing it into an area wherein the user is allowed to rewrite and an area wherein no rewriting is enabled.

[First Embodiment]

A first embodiment of writing data to and reading data from a flash memory in the present invention will be described with reference to the accompanying drawings.

Figure 2:
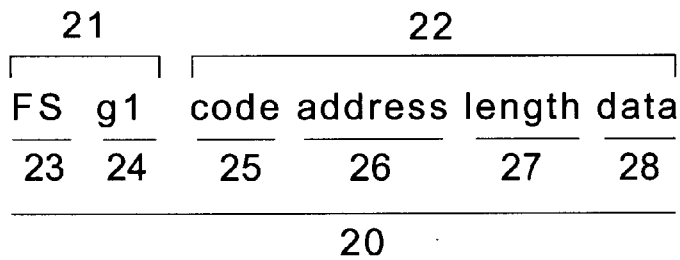
FIG. 2 is a diagram for explaining a first control command for writing various types of information in a printer information area.

FIG. 2 is a diagram showing the first embodiment of a control command for writing various types of information to a printer information area. A write command 20 comprises a command code part 21 and a parameter part 22. The command code part 21 comprises an extension 23 and a function code 24, while the parameter part 22 comprises a functional extension parameter 25, a storage address 26, a stored data amount 27, and stored data 28.

The extension 23 conforms to the ASCII notation character code <1CH>. The function code 24 is a code string for specifying a data storing function; in this example, two character codes are combined to specify the storing function. The functional extension parameter 25 specifies the code for storing data in the flash memory 4. The storage address 26 specifies an absolute address or an offset address of the flash memory 4 at which to start the storage processing. The stored data amount 27 specifies the data amount of the stored data 28. The stored data 28 specifies the data string of the characteristic information or the setting information regarding the printer apparatus 2.

The CPU 3 of the printer apparatus 2 performs the following operations in response to the write command 20:

(1) The functional extension parameter 25 of the write command 20 is compared with a predetermined code, and if the functional extension parameter 25 does not agree with the code, then the storing of data is not performed. This makes it possible to disable destruction or change of data in the case of disagreement with the predetermined code.

(2) The storage address 26 is compared with the area of the flash memory 4, and if the storage address 26 is out of the area of the flash memory 4, then the storing of data is not performed. Further, the stored data amount 27 is compared with the area of the flash memory 4, and if the stored data amount 27 specifies more than the area of the flash memory 4, then the storing of data is not performed. Furthermore, the storage address 26 plus the stored data amount 27 is compared with the area of the flash memory 4, and if the storage address 26 plus the stored data amount 27 exceeds the area of the flash memory 4, then the storing of data is not performed. These processings permit protection of the data in an area inappropriate for the data storage by the write command 20.

(3) If a printing mode has been selected wherein print data sent from the host device 1 is expanded and stored in a line-by-line print buffer, then printing is executed in response to a printing command, and if unprinted data exists in the print buffer, then the storing of data is not performed. This makes it possible to prevent the elimination of unprinted data caused by interruption of the operation of the printer apparatus 2 due to the occurrence of a memory error while data is being stored, thus permitting the protection of print data, the printing of which has not yet been completed.

(4) If a printing mode has been selected in which print data sent from the host device 1 is expanded and stored in a print buffer accommodating a plurality of lines, then printing is executed in response to a printing command, and if a printing area has been set, then the storing of data is not performed. This makes it possible to prevent the elimination of unprinted data caused by interruption of the operation of the printer apparatus 2 due to the occurrence of a memory error while data is being stored, thus permitting the protection of print data, the printing of which has not yet been completed.

(5) If all of the functional extension parameter 25, the storage address 26, and the stored data amount 27 have appropriate values and if the state of the printer apparatus 2 is also appropriate (e.g. a case wherein neither (3) nor (4) applies), then the printer apparatus 2 begins the storing of data in the printer information area of the specified data amount beginning at the specified address in the flash memory 4. This enables the storage of data sent from the host device 1 in the printer apparatus 2.

(6) If the data to be stored 28 coincides with predetermined data, then the storing of data is aborted. This makes it possible to disable writing of the predetermined data to the flash memory 4. For instance, if the domain of data permitted as the data to be stored 28 includes only character codes, then writing of data other than character codes (out of the domain) is disabled.

(7) If the data to be stored 28 is identical to the data stored in the flash memory 4, then the storing of the data is not performed. Thus, the frequency of writing to the flash memory 4 can be reduced.

(8) Data is stored by executing "overwriting", so that previously stored data will be erased. This eliminates the need of a means for initializing the flash memory 4.

(9) If a "write error" occurs during writing, the occurrence of the error will be indicated by an LED, a buzzer, etc., or notified to the host device 1 by sending an error status, a change in a signal line, or the like. This enables an operator or the host device 1 to ascertain that the storing has not been properly completed due to an error that has taken place in the printer apparatus 2.

Figures 3, 4:
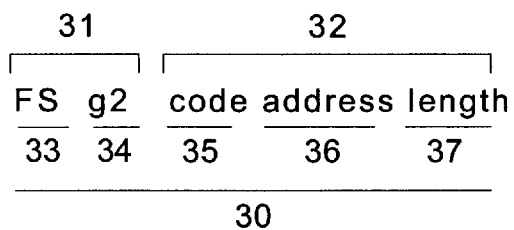
FIG. 3 is a diagram for explaining the first control command for reading various types of information from the printer information area.
FIG. 4 is a diagram illustrating data formats and examples of characteristic information stored in the printer information area.

FIG. 3 is a diagram showing a first embodiment of a control command for reading data from the flash memory. The read command in this example specifies reading of data from the flash memory 4 and sending of data to the host device 1.

A read command 30 comprises a command code part 31 and a parameter part 32. The command code part 31 comprises an extension 33 and a function code 34, while the parameter part 32 comprises a functional extension parameter 35, a read address 36, and a read data amount 37.

The extension 33 conforms to the ASCII notation character code <1CH>. The function code 34 is a code string for specifying a data reading function; in this example, two character codes are combined to specify the reading function. The functional extension parameter 35 specifies the code for reading data from the flash memory 4. The read address 36 specifies an absolute address or an offset address of the flash memory 4 at which to start the reading. The read data amount 37 specifies the amount of data to be read.

The CPU 3 of the printer apparatus 2 performs the following operations in response to the read command 30:

(1) The functional extension parameter 35 of the read command 30 is compared with a predetermined code, and if the functional extension parameter 35 does not agree with the code, then the reading of data is not performed. This makes it possible to disable reading of data in the case of disagreement with the predetermined code.

(2) The read address 36 is compared with the area of the flash memory 4, and if the read address 36 is out of the area of the flash memory 4, then the reading of data is not performed. Further, the read data amount 37 is compared with the area of the flash memory 4, and if the read data amount 37 specifies more than the area of the flash memory 4, then the reading of data is not performed. Furthermore, the read address 36 plus the read data amount 37 is compared with the area of the flash memory 4, and if the read address 36 plus the read data amount 37 exceeds the area of the flash memory 4, then the reading of data is not performed. These processes make it possible to disable reading of erroneous data that is not a target of the read command 30.

(3) If all of the functional extension parameter 35, the read address 36 and the read data amount 37 have appropriate values, then the printer apparatus 2 reads data of the specified data amount stored in the printer information area from the specified address of the flash memory 4, and sends it to the host device 1. This enables the host device 1 to obtain the data stored in the printer apparatus 2.

(4) If a "read error" has occurred during reading, then the occurrence of the error will be indicated by an LED, a buzzer, etc., or notified to the host device 1 by sending an error status, a change in a signal line, or the like. This enables an operator or the host device 1 to ascertain that the read data will not be sent due to an error that has taken place in the printer apparatus 2.

(5) It is possible to add a "header code" or a "terminator code" to data to be sent. This allows the host device 1 to easily recognize the beginning and end of sent data.

Thus, according to the present embodiment, in writing and reading data, data of an arbitrary length can be written at an arbitrary address and data of an arbitrary length can be read from an arbitrary address by specifying an absolute address or an offset address of the flash memory and by further specifying a data length.

[Second Embodiment]

Referring to the accompanying drawings, the following will describe a second embodiment of writing and reading data to and from a flash memory in the present invention.

FIG. 4 shows data formats of characteristic information stored in the foregoing printer information area. Each information stored in the printer information area comprises a key and a terminator as illustrated in (A) of the drawing. The key is a code added to the beginning of data to indicate the position of the beginning of the data; it is a 2-byte character formed of an ASCII character "K" and a consecutive number "n" (n is a natural number) that follows "K". The values of the consecutive number "n" of the key are predetermined according to the type of data to be stored. In one example, a manufacturer's name is assigned to "K1", a model name is assigned to "K2", and a manufacturer's serial number is assigned to "K3". The terminator indicates the end of data; it is a 1-byte NULL character string. The length of each piece of data to be stored is different, and the end of data is determined by the position of the terminator.

In the drawing, (B) illustrates an example wherein "EPSON" is stored as a manufacturer's name in accordance with the foregoing format. The key "K1" corresponding to the manufacturer's name is given at the key position of the data, and the NULL character is given at the end position of the data. The amount of memory occupied in this case is two bytes of the key plus five bytes of data plus one byte of the terminator, totaling eight bytes. In the drawing, (C) represents the foregoing data by hexadecimal ASCII code. "H" is a notation mark indicating that the numeral is hexadecimal.

When a user needs to acquire the name of the manufacturer of the printer apparatus 2, the user sends out from the host device 1 a predetermined read command accompanied by the foregoing "K1" ("4BH31H" according to the ASCII code) as a parameter. Upon receipt of the read command, the CPU 3 of the printer apparatus 2 searches for "K1" in the printer information area and retrieves data therefrom until a terminator appears, and sends it back to the host device 1.

Figures 5, 6:
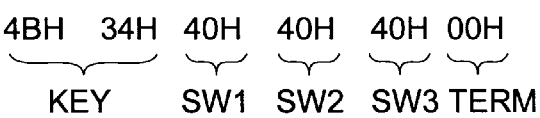
FIG. 5 is a diagram showing an example of the name of a manufacturer, a model name, and a manufacturer's serial number stored in the printer information area.
FIG. 6 is a diagram illustrating data formats and examples of printer setting information stored in the printer information area.

FIG. 5 shows an example of a manufacturer's name, a model name, and a manufacturer's serial number stored in the printer information area in accordance with the foregoing data format. The example shows, for instance, a case wherein "EPSON" is stored as the manufacturer's name, "SE-C1988II" is stored as the model name, and "3B20022933" is stored as the manufacturer's serial number. "K1" is added at the beginning of the manufacturer's name, "K2" is added at the beginning of the model name, and "K3" is added at the beginning of the manufacturer's serial number, respectively, the NULL character string being added at the end of each piece of data. In this case, as shown in the drawing, the respective pieces of actual data to be stored have different data lengths. However, data is read from the position of a corresponding key to the position of the following terminator; hence, desired data can be read regardless of the actual data length.

The printer information area is capable of further including the setting information of the printer apparatus 2. By writing various types of information set by conventional hardware DIP switches to the printer information area, the information can be set or changed more easily.

FIG. 6 (A) illustrates the data format of the setting information of the printer to be stored in the printer information area. Basically, as in the case of the foregoing characteristic information, the setting information is formed by adding a key denoted by "Kn" and a terminator denoted by a NULL character before and after the setting information. In this case, the key for the setting information is represented by "K4". The setting information may include one or a plurality of setting switches (SW1 through SWn) corresponding to one DIP switch. In the drawing, (B) shows the information recorded for each setting switch, the information being binary. Each setting switch is composed of 8 bits (1 byte), two higher-order bits being fixed at 01, while six lower-order bits providing a set value. Fixing the two higher-order bits at 01 (or 10) allows a terminator to be distinguished from setting switch information. Therefore, six different bits of ON/OFF information can be stored by using a single setting switch. In the drawing, (C) and (D) illustrate data serving as the setting information wherein three setting switches (SW1 through SW3) are provided and the setting of all the switches is OFF, i.e., "0", is expressed by ASCII codes and ASCII characters based on the hexadecimal notation. When the setting of all the switches is OFF, each switch is represented by "01000000" including the beginning two fixed bits. This is indicated by "40H" of (C) in the drawing and "@" of (D) in the drawing.

When a user needs to acquire the setting information of the printer apparatus 2, the user sends out from the host device 1 a predetermined read command accompanied by the foregoing "K4" ("4BH34H" according to the ASCII code) as a parameter. Upon receipt of the read command, the CPU 3 of the printer apparatus 2 searches for "K4" in the printer information area and retrieves data therefrom until a terminator appears, and sends it back to the host device 1. At the host device 1, the first two bits among eight bits corresponding to each setting switch are ignored, and the remaining six bits are retrieved thereby to obtain the information regarding each setting switch.

FIG. 7 conceptually illustrates the mapping of the characteristic information (a manufacturer's name, a model name, and a manufacturer's serial number) and the setting information regarding the aforesaid printer apparatus 2 in the printer information area. The foregoing information in the printer information area A is mapped with no spaces in sequence from the beginning of the area according to the consecutive numbers of the keys. One block in the drawing is equal to one byte. If a request for reading data is received from the host device 1, the CPU 3 of the printer apparatus 2 searches for an appropriate key from the start of the memory area. When the appropriate key has been found, the CPU 3 reads the data from that position to the next NULL character as the requested data and sends it back to the host device.

In the above description, the key has been denoted by a mark "Kn" and the terminator has been denoted by the NULL character; however, other marks that permit data to be identified may be employed. A plurality of keys may be set; "E1, E2, . . . , En" or "Y1, Y2, . . . , Yn" or the like may be set in addition to the "K1, K2, . . . , Kn". This permits an application wherein information management is performed by, for example, providing different operators with different keys.

Figure 8:
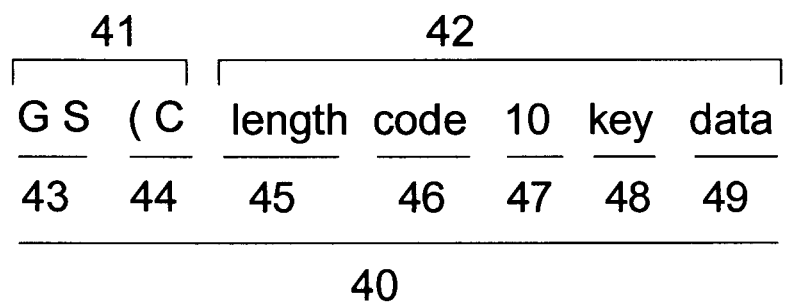
FIG. 8 is a diagram for explaining a second control command for writing various types of information in a printer information area.

FIG. 8 shows a second embodiment of the control command for writing various types of information into the printer information area. This embodiment differs from the first embodiment in that it has a key 48 in place of the storage address 26 and the data to be stored amount 27.

A write command 40 comprises a command code part 41 and a parameter part 42. The command code part 41 comprises an extension 43 and a function code 44, while the parameter part 42 comprises a parameter amount 45, a functional extension parameter 46, a function detail code 47, a key 48, and stored data 49.

The extension 43 conforms to the ASCII notation character code <1DH>. The function code 44 is a code string for specifying the function for editing a printer information area. The parameter amount 45 specifies the amount of the parameter of the parameter part. The functional extension parameter 46 specifies the code for storing data in the flash memory 4. The function detail code 47 specifies the data storing function. The key 48 is a code string for identifying data; it is added at the beginning of data to be stored. The data to be stored 49 specifies a data string of characteristic information or the setting information regarding the printer apparatus 2.

In this example, the functional extension parameter 46 is specified by a 1-byte character code, and the function detail code 47 and the key 48 are specified by 2-byte character codes; hence, the parameter amount 45 will be a number (5+the data to be stored amount) of bytes.

The CPU 3 of the printer apparatus 2 performs the following operations in response to the write command 40:

(1) The functional extension parameter 46 of the write command 40 is compared with a predetermined code, and if the functional extension parameter 46 does not agree with the code, then the storing of data is not performed. This makes it possible to disable destruction or change of data in the case of disagreement with the predetermined code.

(2) The number (stored data 49+3) of bytes is compared with the remaining capacity of the printer information area, and if the number (stored data 49+3) of bytes is greater than the remaining capacity of the printer information area, then the storing of data is not performed. Here, the data to be stored amount is given by a certain number (the parameter amount 45–5) of bytes. Three bytes are added to the data to be stored amount because the data stored in the printer information area includes a two byte key and a one byte terminator. This permits protection of the data in the area inappropriate for the data storage of the write command 40.

(3) If a printing mode has been selected wherein print data sent from the host device 1 is expanded and stored in a line-by-line print buffer, then printing is executed in response to a printing command, and if unprinted data exists in the print buffer, then the storing of data is not performed. This makes it possible to prevent the elimination of unprinted data caused by interruption of the operation of the printer apparatus 2 due to the occurrence of a memory error while data is being stored, thus permitting the protection of print data, the printing of which has not yet been completed.

(4) If a printing mode has been selected in which print data sent from the host device 1 is expanded and stored in a print buffer accommodating a plurality of lines, then printing is executed in response to a printing command, and if a printing area has been set, then the storing of data is not performed. This makes it possible to prevent the elimination of unprinted data caused by interruption of the operation of the printer apparatus 2 due to the occurrence of a memory error while data is being stored, thus permitting the protection of print data, the printing of which has not yet been completed.

(5) If the functional extension parameter 46 and the key 48 have appropriate values and if the state of the printer apparatus 2 is also appropriate (e.g. a case wherein neither (3) nor (4) applies), then the CPU 3 begins the storing of data in the printer information area. This enables the storage of data sent from the host device 1 in the printer apparatus 2.

(6) If the data to be stored 49 coincides with predetermined data, then the storing of data is aborted. This makes it possible to disable writing of the predetermined data to the flash memory 4. For instance, if the domain of data permitted as the data to be stored 49 includes only character codes, then writing of data other than character codes (out of the domain) is disabled.

(7) If the data to be stored 49 and the data stored in the flash memory 4 are the same, then the storing of the data is not performed. Thus, the frequency of writing to the flash memory 4 can be reduced.

(8) Data is stored by executing "overwriting", so that previously stored data will be erased. This eliminates the need of a means for initializing the flash memory 4.

(9) If a "write error" occurs during writing, the occurrence of the error will be indicated by an LED, a buzzer, etc., or notified to the host device 1 by sending an error status, a change in a signal line, or the like. This enables an operator or the host device 1 to ascertain that the storing has not been properly completed due to an error that has taken place in the printer apparatus 2.

(10) The key 48 is searched for in sequence from the beginning of the printer information area, all data from a first matched key to a terminator is deleted, and newly specified stored data 49 is stored. This makes it possible to prevent the presence of a plurality of the same keys.

(11) A terminator is automatically added in storing the stored data 49 in the printer information area. This permits reliable storing in accordance with the data format of (key+stored data+terminator).

Figure 9:
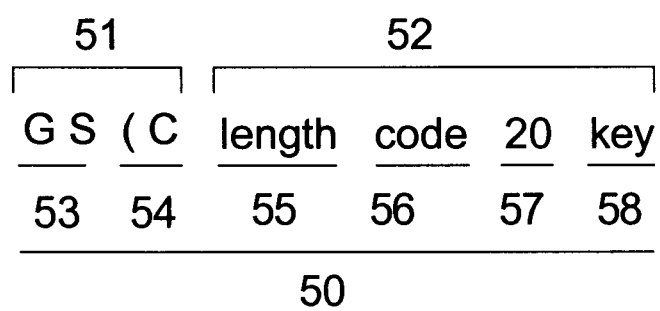
FIG. 9 is a diagram for explaining the second control command for reading various types of information from the printer information area.

FIG. 9 shows a second embodiment of the control command for reading various types of information from the printer information area. This embodiment differs from the first embodiment in that it has a key 58 in place of the storage address 36 and the stored data amount 37.

A read command 50 comprises a command code part 51 and a parameter part 52. The command code part 51 comprises an extension 53 and a function code 54, while the parameter part 52 comprises a parameter amount 55, a functional extension parameter 56, a function detail code 57, and a key 58.

The extension 53 conforms to the ASCII notation character code <1DH>. The function code 54 is a code string for specifying a function for editing the printer information area. The parameter amount 55 specifies the parameter amount of the parameter part. The functional extension parameter 56 specifies the code for reading data from the flash memory 4. The function detail code 57 specifies the function for reading data. The key 58 is a code string for identifying data, and it specifies data to be read.

In this example, the functional extension parameter 56 is specified by a 1-byte character code, and the function detail code 57 and the key 58 are specified by 2-byte character codes; hence, the parameter amount 55 will be five bytes.

The CPU 3 of the printer apparatus 2 performs the following operations in response to the read command 50:

(1) The functional extension parameter 56 of the read command 50 is compared with a predetermined code, and if the functional extension parameter 56 does not agree with the code, then the reading of data is not performed. This makes it possible to disable reading of data in the case of disagreement with the predetermined code.

(2) If the functional extension parameter 56 and the key 58 have valid values, then the CPU 3 searches for the key from the beginning of the printer information area, reads data between a first matched key and a terminator, and sends it to the host device 1. This enables the host device 1 to obtain the data stored in the printer apparatus 2.

(4) If a "read error" has occurred during reading, then the occurrence of the error will be indicated by an LED, a buzzer, etc., or notified to the host device 1 by sending an error status, a change in a signal line, or the like. This enables an operator or the host device 1 to ascertain that the read data will not be sent due to the error that has taken place in the printer apparatus 2.

(5) It is possible to add a "header code" or a "terminator code" to data to be sent. This allows the host device 1 to easily recognize the beginning and end of sent data.

(6) If no data exists between a key and a terminator, then the CPU 2 sends a message to that effect to the host device 1. This allows the host device 1 to distinguish a case wherein no key exists from a case wherein no data exists although a key exists.

(7) If a specified key cannot be detected, no terminator can be detected, or data out of a domain is detected in the data between a key code and a terminator, then a message indicating that there is something wrong with the data is sent to the host device 1.

Referring now to an accompanying flowchart, the processing for writing and reading data to and from the flash memory 4 from the host device 1 will be described.

Figure 10:
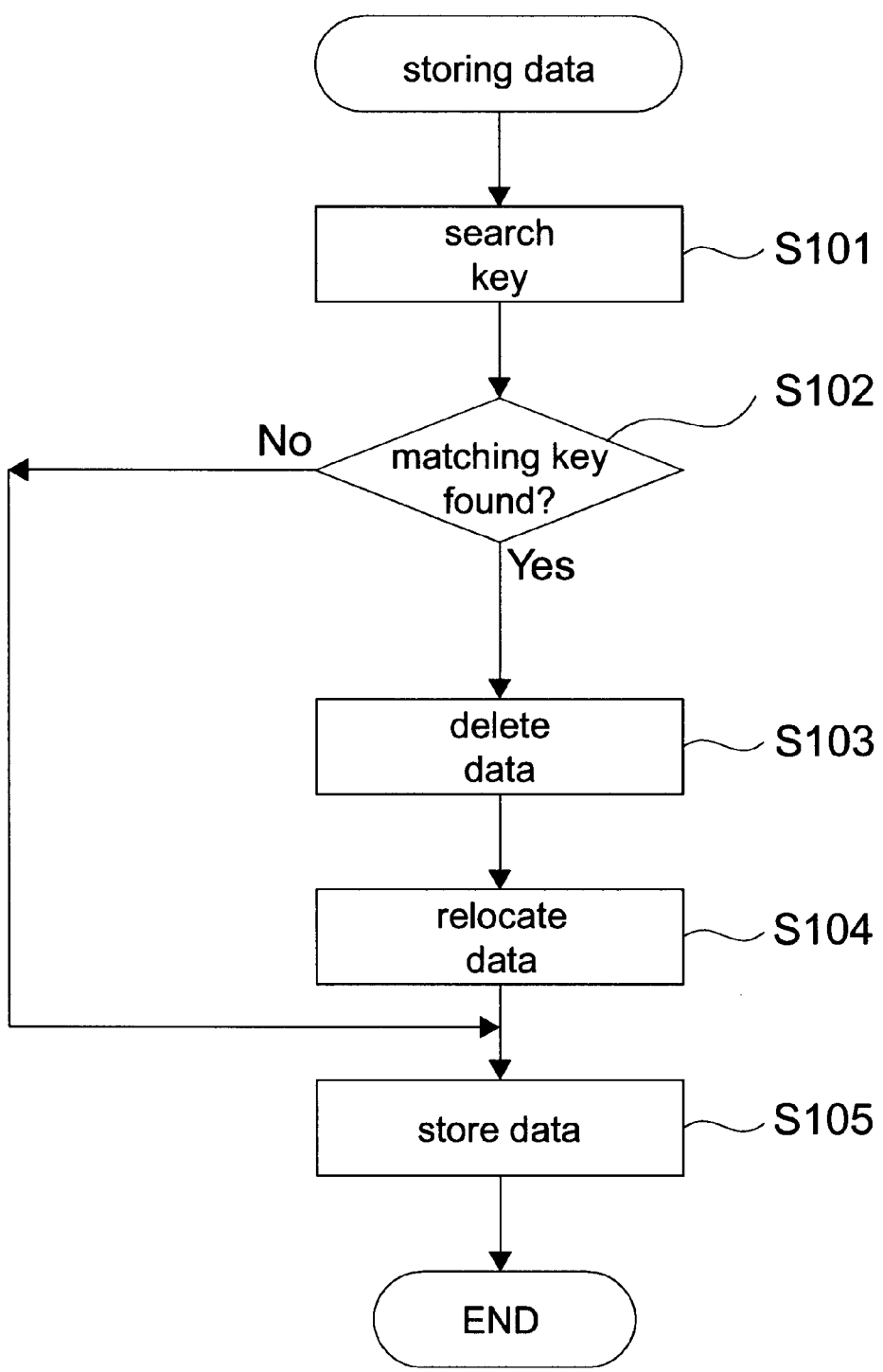
FIG. 10 is a flowchart illustrative of the processing for storing the characteristic information and the setting information regarding the printer apparatus.

FIG. 10 shows a flowchart of the processing for storing data in the printer information area of the flash memory 4. When the data write command 40 is received from the host device 1, the CPU 3 of the printer apparatus 2 searches for the key specified by the write command 40 in the printer information area (S101). If a matching key is found (Yes in S102), then the CPU 3 deletes the data from the key to a first terminator (S103), and re-stores the data that has been stored following the deleted data by moving it forward (S104). Next, the CPU 3 stores the data specified by the write command 40 at the tail of the data already stored in the printer information area (S105). On the other hand, if no key matching the key specified by the write command 40 exists in the printer information area (No in S102), then the CPU 3 moves to step S105 wherein it stores the data specified by the write command 40 at the tail of the data already stored in the printer information area.

Thus, the data is relocated according to the size of data at the time of storing the data; hence, data can always be disposed with no space, in between permitting effective use of the printer information area. Furthermore, as long as the capacity of the printer information area permits, a user may assign predetermined keys to, for example, maintenance information, firmware version information, etc. and store them.

Figure 11:
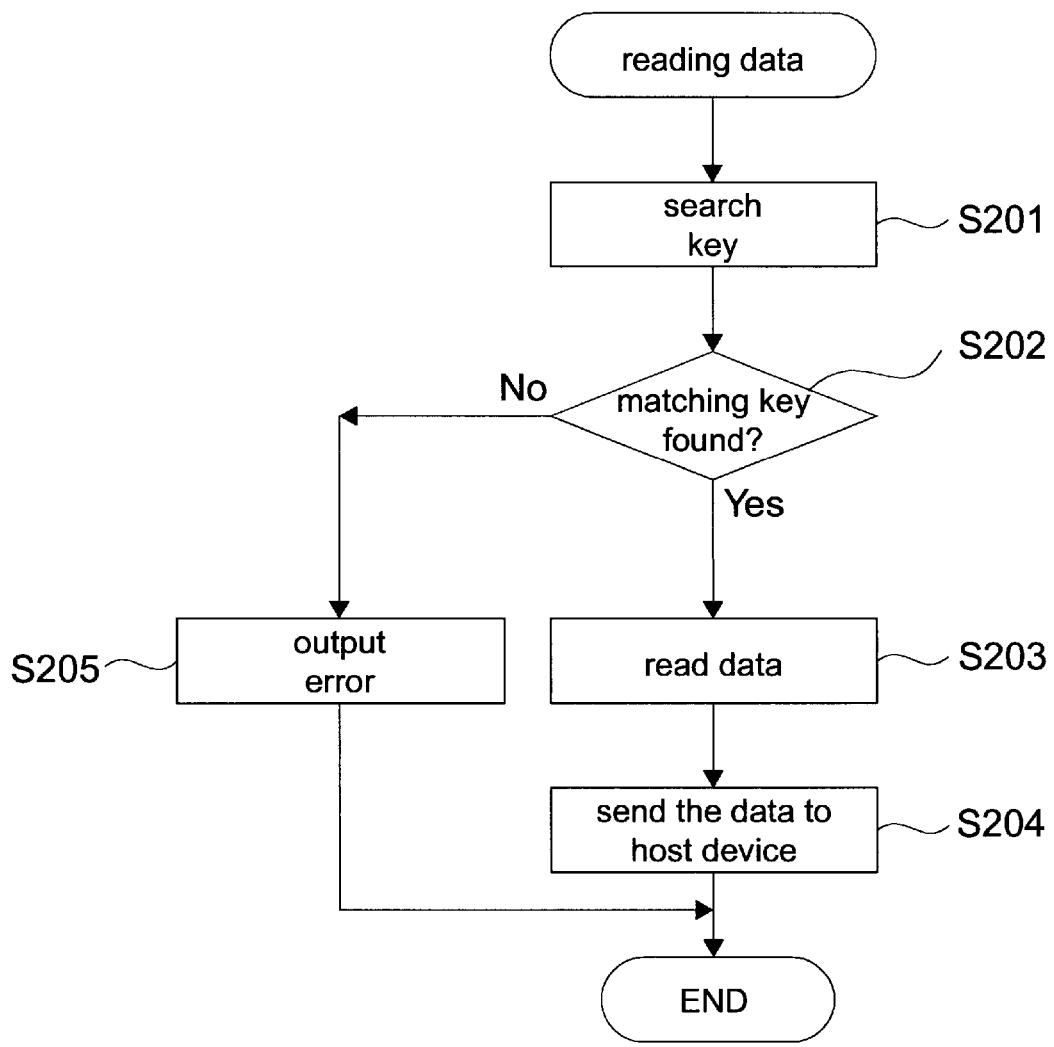
FIG. 11 is a flowchart illustrative of the processing for reading the characteristic information and the setting information regarding the printer apparatus.

FIG. 11 shows a flowchart of the processing for reading the data from the printer information area of the flash memory 4. Upon receipt of the data read command 50 from the host device 1, the printer apparatus 2 searches for the key specified by the read command 50 in the printer information area (S201). If a matched key is found (Yes in S202), then the printer apparatus 2 reads the data from the key to a first terminator (S203), and sends the read data to the host device 1 (S204). On the other hand, if no key matching the key specified by the read command 50 is found in the printer information area (No in S202), the printer apparatus 2 outputs an error and terminates the processing (S205).

Thus, the user can easily obtain desired data simply by specifying a key attached to data.

Figure 12:
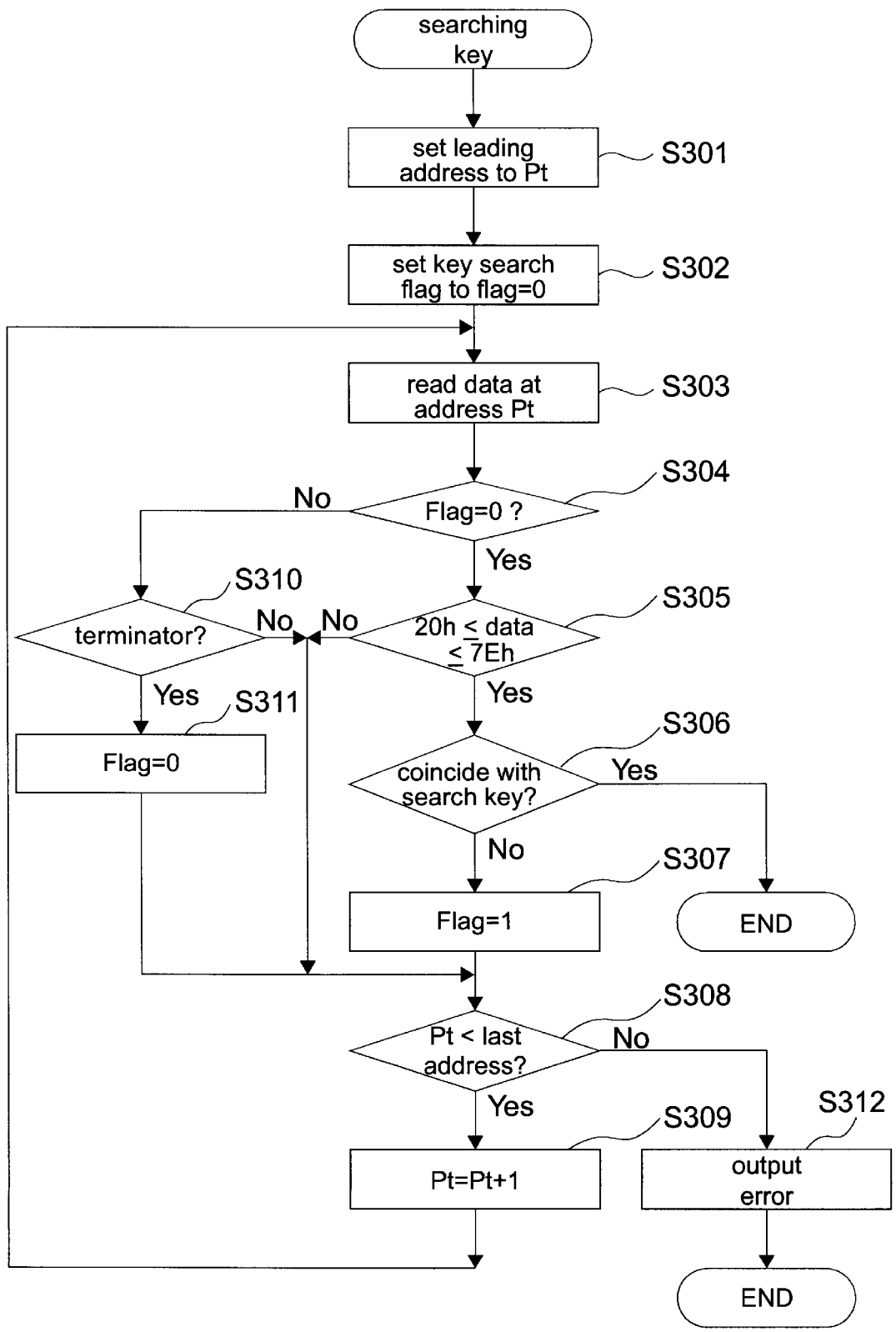
FIG. 12 is a flowchart illustrative of the processing for searching a key.

The processing for finding a key (S102 and S202) in storing data and reading data set forth above will now be described. FIG. 12 shows the flowchart of the processing for finding a key. Upon receipt of the write command 40 or the read command 50 from the host device 1, the printer apparatus 2 sets the address at which the search in the flash memory 4 is begun to a variable Pt. In this example, Pt is used to set the leading address in the printer information area (S301). Further, a flag indicating a valid/invalid key search is set to valid (S302). In this example, Flag=0 indicates valid, whereas Flag=1 indicates invalid.

Subsequently, 1-byte data stored at the address Pt is read (S303), and if the key search is valid (Yes in S304), then it is determined whether the read data is included in a predetermined key domain (S305). In this example, the range from 20h to 7Eh in the character code table is defined as the key domain. If the read data is found to be within the domain in step S305, then it is determined whether the search key specified by the command agrees with the read data (S306), and if they agree with each other (Yes in S306), then it is decided that the key has been found and the searching is terminated. In the case of disagreement (No in S306), then it can be determined that the read data is different from the key specified by the command; therefore, the key search flag is set to invalid (Flag=1) (S307).

On the other hand, if the key search is invalid in step S304 (No in S304), then it is determined whether the data read in step S303 is a terminator (S310). If the data is a terminator, then the key search flag is set to "0" to validate the key search (S311). If the data is not a terminator, then the program proceeds to step S308 with the key search set to invalid. This makes it possible to handle only the data stored at the leading address in the printer information area and the data immediately following the terminator for the key search.

Then, in step S308, it is determined whether the address Pt is the last address in the printer information area, and if it is the last address (No in S308), then an error code indicating that the key specified by the command has not been found is output, and the key searching is terminated (S312). If the address Pt is not the last address (Yes in S308), then the program increments the address (S309) and goes back to step S303 to repeat the above processing.

Thus, by taking advantage of keys that are stored at the head of the printer information area or immediately after terminators, the key search flag is rendered valid when a terminator is found so as to find a key. This makes it possible to prevent an error in which even if data identical to a key exists in data, the data is where erroneously detected as the key. When a key has been searched for, the data up to the next terminator is found can be recognized as requested data. This allows a host device to easily write and read data without performing address management in the nonvolatile memory.

In the present embodiment, it is also possible to implement a function for deleting data associated with a specified key or a function for sending the occupied capacity or remaining capacity of a printer information area by expanding the function detail code. For instance, data can be deleted by setting the function detail code to 0, the occupied capacity can be sent by setting it to 3, and the remaining capacity can be sent by setting it to 4. The capacity of the printer information area can be known from the occupied capacity and the remaining capacity. Alternatively, the function for sending the capacity of the printer information area may be added to the function detail code.

An embodiment wherein the present invention is used as a system will now be described.

First, the characteristic information regarding a printer apparatus is stored in the printer information area of the flash memory 4 included in the printer apparatus 2 by specifying a storage address by the write command 20 or by specifying a key using the write command 40. The basic information in this embodiment is as shown below:

Information K3: Manufacturer's serial No. of printer apparatus

Information K5: Purchase date of the printer apparatus

Information K6: Telephone number for inquiry

Information K7: Name of person to contact for inquiry

Information K8: Name of person in charge of management of printer apparatus

Information K9: Place where printer apparatus documentation is retained.

If paper runs out while the printer apparatus 2 is in operation and if an operator does not know how to add paper, the operator can obtain "Information K9: Place where printer apparatus documentation is retained" from the printer information area by specifying a storage address with the read command 30 or by specifying a key with the read command 50. Thus, even an operator who does not know the place where the document is kept can check the procedure for adding paper described in the document. At this time, if the operator is still not sure how to add paper after reading the document, then the operator can obtain instructions from a person versed in the handling of the product by acquiring "Information K8: Name of person in charge of management of printer apparatus" from the printer information area by using the read command 30 or 50.

Next, if any problem that requires an inquiry to the manufacturer takes place during the operation of the printer apparatus 2, then the operator can receive appropriate advice over a telephone by acquiring "Information K6: Telephone number for inquiry" and "Information K7: Name of person to contact for inquiry" from the printer information area by using the read command 30 or 50. If it is necessary to know the "Information K3: Manufacturer's serial No. of printer apparatus" and "Information K5: Purchase date of the printer apparatus" of the printer apparatus 2 at the time of an inquiry, such information can be obtained and prepared from the printer information area by using the read command 30 or 50.

Further, if the person to contact for inquiry has been changed, then only "Information K7: Name of person to contact for inquiry on printer apparatus" is rewritten in the printer information area by using the write command 20 or 40 thereby permitting the information to be updated without affecting other data.

Thus, it becomes possible to easily and positively address a problem with a printer apparatus by storing the characteristic information for managing the printer apparatus in the flash memory of the printer apparatus by using the write command and by preparing a system for acquiring required information by the read command when the host device needs it.

The embodiments of the present invention have been set forth in conjunction with the accompanying drawings. The present invention, however, is not limited to the particulars shown in the above embodiments; it includes a scope wherein those skilled in the art are able to implement modification or application thereof according to the scope of the attached claims, the detailed description of the present invention, and well-known arts.

In the foregoing embodiments, flash memories have been used as the nonvolatile memories; however, other memories such as EEPROMs or RAMs with backup features may be used as long as stored contents can be retained in a state wherein no power is supplied. The data stored in the nonvolatile memories is not limited to that shown in the above embodiments; it may alternatively be data regarding various types of printer apparatuses or a part of the data shown in the embodiments. In the nonvolatile memories, font data or programs, etc. may be also stored.

Thus, according to the present invention, an arbitrary block in a nonvolatile memory can be specified by an address or a key to write or read data of an arbitrary data length.

Moreover, a plurality of pieces of information concerning a printer apparatus can be efficiently stored in a nonvolatile memory, thus permitting flexible change or addition of data.

What is claimed is:

1. A printer apparatus connected to a host device to perform printing based on a command and data from said host device, comprising:

nonvolatile storage that retains stored contents in a state when no power is supplied to said printer apparatus;

data storing means for receiving a first command from said host device and data following said first command from said host device, said data storing means for interpreting an address and a data amount specified in said first command and for storing said data received following said first command in said nonvolatile storage at said address and in said amount specified in said first command from said host device; and data reading means for receiving a second command from said host device and for reading data stored in said nonvolatile storage and transmitting it to said host device in response to said second command from said host device.

2. A printer apparatus according to claim 1, wherein said data reading means is for interpreting an address and a data amount specified in said second command and for reading and sending data in an amount specified by said second command from an address in said nonvolatile storage specified by said second command.

3. A printer apparatus according to claim 1, wherein said data storing means is for detecting predetermined data among data to be stored and for aborting said storing of data if said predetermined data is found among data to be stored.

4. A printer apparatus according to claim 1, further comprising:

first printing control means for expanding a predetermined amount of print data received from said host device into a print buffer accommodating a plurality of lines, then printing the contents of said print buffer;

second printing control means for sequentially printing print data received from said host device; and printing-mode selecting means for selecting one of said first and second printing control means in response to a command from said host device; and said data storing means is responsive to said printing-mode selecting means for aborting the storing of data if said first printing control means has been selected by said printing-mode selecting means.

5. A printer apparatus according to claim 1, further comprising:

first address-verifying means for determining whether said address in said nonvolatile storage specified by said first command is valid; and said data storing means is responsive to said first address-verifying means for aborting the storing of said data if said address is not valid a determined by said first address-verifying means.

6. A printer apparatus according to claim 1, further comprising:

first data-amount verifying means for determining whether said amount of data specified by said first command is valid; and said data storing means is responsive to said first data-amount verifying means for aborting the storing of said data if said data amount is not valid as determined by said first data-amount verifying means.

7. A printer apparatus according to claim 2, further comprising:

second address-verifying means for determining whether said address in said nonvolatile storage specified by said second command is valid; and said data reading means is responsive to said second address-verifying means for aborting the reading and sending of said data if said address is not valid as determined by said second address-verifying means.

8. A printer apparatus according to claim 2, further comprising:

second data-amount verifying means for determining whether said amount of data specified by said second command is valid; and said data reading means is responsive to said second data-amount verifying means for aborting the reading and sending of said data if said data amount is not valid as determined by said second data-amount verifying means.

9. A printer apparatus according to claim 1, further comprising:

means for setting a code for authorizing the reading of said data in said first command; and means for comparing a code for reading said data specified in said second command with said code set in said first command; and said data reading means is responsive to said means for comparing for reading and sending said stored data only if said code in said second command agrees with said code in said first command.

10. A printer apparatus according to claim 1, wherein:

said nonvolatile storage comprises a plurality of areas; and further comprising means for disabling one of the storing of data in at least one area of said plurality of areas of said nonvolatile storage and the reading of data from at least one area of said plurality of areas of said nonvolatile storage.

11. A printer apparatus connected to a host device to perform printing based on commands and data from said host device, comprising:

nonvolatile storage that retains stored contents in a state when no power is supplied to said printer apparatus;

said nonvolatile storage comprising an area for storing a plurality of types of information, said information being formed with a key specific to said information that indicates the beginning of said information and a terminator that indicates the end of said information; and data storing means for receiving a first command from said host device and data following said first command, said data storing means for storing in said nonvolatile storage said data received following said first command, a key specified in said first command, and a terminator.

12. A printer apparatus according to claim 11, wherein a key stored in said nonvolatile storage is positioned at one of a leading address of the area of said nonvolatile storage and immediately following a terminator.

13. A printer apparatus according to claim 11, further comprising:

data reading means for receiving a second command from said host device and for reading data stored in said nonvolatile storage and sending it to said host device according to said second command from said host device.

14. A printer apparatus according to claim 11, further comprising:

first key-searching means for searching said key specified in said first command in the area of said nonvolatile storage; and said data storing means is responsive to said first key-searching means for deleting previously stored data in the area of said nonvolatile storage from said key to said terminator and for storing said key, said data, and said terminator.

15. A printer apparatus according to claim 14, further comprising:

information rearranging means for rearranging the placement of information stored in the area of said nonvolatile storage; and wherein, if said data has been deleted by said data storing means, then the placement of data stored behind said deleted data is rearranged according to said deleted data amount.

16. A printer apparatus according to claim 11, wherein said data storing means stores said key, said data, and said terminator immediately after a last terminator among said terminators stored in the area of said nonvolatile storage.

17. A printer apparatus according to claim 11, wherein said data storing means is for detecting predetermined data among data to be stored and for aborting said storing of data if said predetermined data is found among data to be stored.

18. A printer apparatus according to claim 11, further comprising:

first printing control means for expanding a predetermined amount of print data received from said host device into a print buffer accommodating at plurality of lines, then printing the contents of said print buffer;

second printing control means for sequentially printing print data received from said host device; and printing-mode selecting means for selecting one of said first and second printing control means in response to a command from said host device; and said data storing means is responsive to said printing-mode selecting means for aborting the storing of data if said first printing control means has been selected by said printing-mode selecting means.

19. A printer apparatus according to claim 11, further comprising:

first data-amount verifying means for determining whether said amount of data specified by said first command is valid; and said data storing means is responsive to said first data-amount verifying means for aborting the storing of said data if said data amount is not valid as determined by said first data-amount verifying means.

20. A printer apparatus according to claim 13, further comprising:

key-searching means for searching a key specified in said second command in an area of said nonvolatile storage; and said data reading means is responsive to said key-searching means for reading and sending data in the area from said key specified in said second command to said terminator.

21. A printer apparatus according to claim 20, wherein, if no data exists between said key specified in said second command and said terminator, then said data reading means sends a message indicating no data exists.

22. A printer apparatus according to claim 20, wherein, if said key specified in said second command does not exist in the area, then said data reading means is responsive to said key-searching means for sending a message that said key does not exist.

23. A printer apparatus according to claim 20, wherein, if said terminator does not exist, then said data reading means sends a message that said terminator does not exist.

24. A printer apparatus according to claim 20, wherein, if predetermined data is found among read data, then said data reading means sends a message that data is found among read data.

25. A printer apparatus according to claim 11, further comprising:

data deleting means for deleting data stored in said nonvolatile storage in response to a third command from said host device; and key-searching means for searching a key specified in said third command in the area of said nonvolatile storage; and said data deleting means is responsive to said key-searching means for deleting data in the area from said key specified in said third command to said terminator.

26. A printer apparatus according to claim 25, further comprising:

information rearranging means for rearranging the placement of information stored in the area of said nonvolatile storage; and wherein, if said data has been deleted by said data deleting means, then the placement of data stored behind said deleted data is rearranged according to said deleted data amount.

27. A printer apparatus according to claim 25, further comprising:

first printing control means for expanding a predetermined amount of print data received from said host device into a print buffer accommodating a plurality of lines, then printing the contents of said print buffer;

second printing control means for sequentially printing print data received from said host device; and printing-mode selecting means for selecting one of said first and second printing control means in response to a command from said host device; and said data storing means is responsive to said printing-mode selecting means for aborting deletion of said data if said first printing control means has been selected by said printing-mode selecting means.

28. A printer apparatus according to claim 11, further comprising:

occupied-capacity detecting means for detecting and sending an indication of an occupied capacity in the area of said nonvolatile storage in response to a third command from said host device.

29. A printer apparatus according to claim 11, further comprising:

remaining-capacity detecting means for detecting and sending an indication of a remaining capacity of the area of said nonvolatile storage in response to a fourth command from said host device.

30. A printer apparatus according to claim 11, further comprising:

area-capacity sending means for sending the capacity of the area of said nonvolatile storage in response to a fifth command from said host device.

31. A printer apparatus according to claim 13, further comprising:

means for setting a code for authorizing the reading of said data in said first command; and means for comparing a code for reading said data specified in said second command with said code set in said first command; and said data reading means is responsive to said means for comparing for reading and sending said stored data only if said code in said second command agrees with said code in said first command.

32. A printer apparatus according to claim 13, wherein:

said nonvolatile storage comprises a plurality of areas; and further comprising means for disabling one of the storing of data in at least one area of said plurality of areas of said nonvolatile storage and the reading of data from at least one area of said plurality of areas of said nonvolatile storage.

33. A control method for a printer apparatus connected to a host device to perform printing based on a command and data from said host device and which comprises nonvolatile storage that retains stored contents in a state when no power is supplied to said printer apparatus, said control method comprising:

storing data received following a first command in said nonvolatile storage in response to said first command from said host device; and reading data stored in said nonvolatile storage and transmitting it to said host device in response to a second command from said host device; and wherein said storing data step stores data in an amount specified by said first command at an address in said nonvolatile storage specified by said first command.

34. A control method for a printer apparatus according to claim 33, wherein said reading data step reads and sends data in an amount specified by said second command from an address in said nonvolatile storage specified by said second command.

35. A control method for a printer apparatus according to claim 33, further comprising:

detecting whether predetermined data exists in said data to be stored; and wherein, if, according to a result of said detection step, predetermined data is found among data to be stored, then said storing data step aborts storing said data.

36. A control method for a printer apparatus according to claim 33, further comprising:

expanding a predetermined amount of print data received from said host device into a print buffer accommodating a plurality of lines, then printing the contents of said print buffer;

sequentially printing print data received from said host device; and selecting one of said expanding and sequentially printing steps in response to a command from said host device; and wherein said storing data step does not carry out the storing of data if said expanding step has been selected according to a result of said selecting step.

37. A control method for a printer apparatus according to claim 33, further comprising:

determining whether said address in said nonvolatile storage specified by said first command is valid; and wherein said storing data step does not carry out the storing of said data if said address is not valid according to a result of said determining step.

38. A control method for a printer apparatus according to claim 33, further comprising:

determining whether said amount of data specified by said first command is valid; and wherein said storing data step does not carry out the storing of said data if said data amount is not valid according to a result of said determining step.

39. A control method for a printer apparatus according to claim 34, further comprising:

determining whether said address in said nonvolatile storage specified by said second command is valid; and wherein said reading data step does not carry out the reading and sending of said data if said address is not valid according to said determining step.

40. A control method for a printer apparatus according to claim 34, further comprising:

determining whether said amount of data specified by said second command is valid; and wherein said data reading step does not carry out the reading and sending of said data if said data amount specified by said second command is not valid according to a result of said determining step.

41. A control method for a printer apparatus according to claim 33, further comprising:

setting a code for authorizing the reading of said data in said first command; and comparing a code for reading said data specified in said second command with said code set in said first command;

wherein said data reading step carries out the reading and sending of said stored data only if said code in said second command agrees with said code in said first command according to a result of said code-comparing step.

42. A control method for a printer apparatus according to claim 33, wherein:

said nonvolatile storage comprises a plurality of areas; and further comprising disabling one of the storing of data in at least one area of said plurality of areas of said nonvolatile storage and the reading of data from at least one area of said plurality of areas of said nonvolatile storage.

43. A control method for a printer apparatus connected to a host device to perform printing based on commands and data from said host device and which comprises nonvolatile storage that retains stored contents in a state when no power is supplied to said printer apparatus, said control method comprising:

storing information in said nonvolatile storage in response to a first command from said host device, said information being formed with a key specific to said information that indicates the beginning of said information and a terminator that indicates the end of said information; and reading data stored in said nonvolatile storage and sending it to said host device in response to a second command from said host device; and wherein said storing step stores in said nonvolatile storage data received following said first command, a key specified by said first command and a terminator.

44. A control method for a printer apparatus according to claim 43, further comprising:

searching said key specified by said first command in an area of said nonvolatile storage; and wherein said storing data step deletes previously stored data in the area from said key to said terminator and stores said key, said data, and said terminator according to a result of said key-searching step.

45. A control method for a printer apparatus according to claim 44, further comprising:

rearranging the placement of information stored in the area of said nonvolatile storage; and wherein if said data has been deleted by said storing data step, then the placement of data stored behind said deleted data is rearranged according to said deleted data amount.

46. A control method for a printer apparatus according to claim 43, wherein said storing data step stores said key, said data, and said terminator immediately after a last terminator among said terminators stored in the area of said nonvolatile storage.

47. A control method for a printer apparatus according to claim 43, further comprising:

detecting whether predetermined data exists in said data to be stored; and wherein if predetermined data is found among data to be stored, then said storing data step aborts storing data according to a result of said detection step.

48. A control method for a printer apparatus according to claim 43, further comprising:

expanding a predetermined amount of print data received from said host device into a print buffer accommodating a plurality of lines, then printing the contents of said print buffer;

sequentially printing print data received from said host device; and selecting one of said expanding and sequentially printing steps in response to a command from said host device; and wherein said storing data step does not carry out the storing of said data if said expanding step has been selected according to a result of said selecting step.

49. A control method for a printer apparatus according to claim 43, further comprising:

determining whether the amount of data specified by said first command is valid; and wherein said storing data step does not carry out the storing of said data if said data amount is not valid according to a result of said determining step.

50. A control method for a printer apparatus according to claim 43, further comprising:

searching a key specified by said second command in an area of said nonvolatile storage; and wherein said reading data step reads and sends data in the area from said key specified in said second command to said terminator according to a result of said searching step.

51. A control method for a printer apparatus according to claim 50, wherein, if no data exists between said key and said terminator, then said reading data step sends a message indicating no data exists.

52. A control method for a printer apparatus according to claim 50, wherein, if said key specified by said second command does not exist, then said reading data step sends a message indicating no key exists according to a result of said searching step.

53. A control method for a printer apparatus according to claim 50, wherein, if said terminator does not exist, then said reading data step sends a message indicating no terminator exists.

54. A control method for a printer apparatus according to claim 50, wherein, if predetermined data is found among read data, then said reading data step sends a message indicating predetermined data is found.

55. A control method for a printer apparatus according to claim 43, further comprising:

deleting data stored in said nonvolatile storage in response to a third command from said host device; and searching a key specified in said third command in the area of said nonvolatile storage; and wherein said deleting data step deletes data in the area from said key specified in said third command to said terminator according to a result of said searching step.

56. A control method for a printer apparatus according to claim 55, further comprising:

rearranging the placement of information stored in the area of said nonvolatile storing means; and wherein if said data has been deleted by said deleting data step, then the placement of data stored behind said deleted data is rearranged according to said deleted data amount.

57. A control method for a printer apparatus according to claim 55, further comprising:

expanding a predetermined amount of print data received from said host device into a print buffer accommodating a plurality of lines, then printing the contents of said print buffer;

sequentially printing print data received from said host device; and selecting one of said expanding and sequentially printing steps in response to a command from said host device;

wherein said storing data step does not delete said data if said expanding control step has been selected according to a result of said selecting step.

58. A control method for a printer apparatus according to claim 43, further comprising:

detecting an occupied capacity in the area of said nonvolatile storage and sending an occupied capacity indication in response to a third command from said host device.

59. A control method for a printer apparatus according to claim 43, further comprising:

detecting a remaining capacity of the area of said nonvolatile storage and sending a remaining capacity indication in response to a fourth command from said host device.

60. A control method for a printer apparatus according to claim 43, further comprising:

sending the capacity of the area of said nonvolatile storage in response to a fifth command from said host device.

61. A control method for a printer apparatus according to claim 43, further comprising:

setting a code for authorizing the reading of said data in said first command; and comparing a code for reading said data specified in said second command with said code set in said first command; and wherein said reading data step performs the reading and sending of said stored data only if said code specified in said second command agrees with said code specified in said first command according to a result of said code-comparison step.

62. A control method for a printer apparatus according to claim 43, wherein:

said nonvolatile storage comprises a plurality of areas; and further comprising disabling one of the storing of data in at least one area of said plurality of areas of said nonvolatile storage and the reading of data from at least one area of said plurality of areas of said nonvolatile storage.

63. A recording medium readable by a machine embodying a program of instructions executable by said machine to perform a method of controlling a printer apparatus, said printer apparatus connected to a host device to perform printing based on a command and data from said host device and having a nonvolatile storage that retains stored contents in a state when no power is supplied to said printer apparatus, said method comprising:

storing data received following a first command in said nonvolatile storage in response to said first command from said host device; and a data reading step for reading data stored in said nonvolatile storage and transmitting it to said host device in response to a second command from said host device; and wherein said storing data step stores data in an amount specified by said first command at an address in said nonvolatile storage specified by said first command.

64. A recording medium according to claim 63, wherein said reading data step reads and sends data in an amount specified by said second command from an address in said nonvolatile storage specified by said second command.

65. A recording medium according to claim 63 wherein said method further comprises:

detecting whether predetermined data exists in said data to be storage; and wherein, if, according to a result of said detection step, predetermined data is found among data to be stored, then said storing data step aborts storing said data.

66. A recording medium according to claim 63, wherein said method further comprises:

expanding a predetermined amount of print data received from said host device into a print buffer accommodating a plurality of lines, then printing the contents of said print buffer;

sequentially printing print data received from said host device; and selecting one of said expanding and sequentially printing steps in response to a command from said host device; and wherein said storing data step does not carry out the storing of data if said expanding step has been selected according to a result of said selecting step.

67. A recording medium according to claim 63, wherein said method further comprises:

determining whether said address in said nonvolatile storage specified by said first command is valid; and wherein said storing data step does not carry out the storing of said data if said address is not valid according to a result of said determining step.

68. A recording medium according to claim 63, wherein said method further comprises:

determining whether said amount of data specified by said first command is valid; and wherein said storing data step does not carry out the storing of said data if said data amount is not valid according to a result of said determining step.

69. A recording medium according to claim 64, wherein said method further comprises:

determining whether said address in said nonvolatile storage specified by said second command is valid;

wherein said reading data step does not carry out the reading and sending of said data if said address is not valid according to said determining step.

70. A recording medium according to claim 64, wherein said method further comprises:

determining whether said amount of data specified by said second command is valid; and wherein said data reading step does not carry out the reading and sending of said data if said data amount specified by said second command is not valid according to a result of said determining step.

71. A recording medium according to claim 63, wherein said method further comprises:

setting a code for authorizing the reading of said data in said first command; and comparing a code for reading said data specified in said second command with said code set in said first command;

wherein said data reading step carries out the reading and sending of said stored data only if said code agrees in said second command with said code in said first command according to a result of said code-comparing step.

72. A recording medium according to claim 63, wherein:

said nonvolatile storage comprises a plurality of areas; and further comprising disabling one of the storing of data in at least one area of said plurality of areas of said nonvolatile storage and the reading of data from at least one area of said plurality of areas of said nonvolatile storage.

73. A recording medium readable by a machine embodying a program of instructions executable by said machine to perform a method of controlling a printer apparatus, said printer apparatus connected to a host device to perform printing based on commands and data from said host device and having a nonvolatile storage that retains stored contents in a state when no power is supplied to said printer apparatus, said method comprising:

storing information in said nonvolatile storage in response to a first command from said host device, said information being formed with a key specific to said information that indicates the beginning of said information and a terminator that indicates the end of said information; and reading data stored in said nonvolatile storage and sending it to said host device in response to a second command from said host device; and wherein said storing step stores in said nonvolatile storage data received following said first command, a key specified by said first command and a terminator.

74. A recording medium according to claim 73, wherein said method further comprises:

a first key-searching step for searching said key specified by said first command in an area of said nonvolatile storing means;

wherein said data storing step deletes data from said key to said terminator and stores said key, said data, and said terminator according to a result of said first key-searching step.

75. A recording medium according to claim 74, wherein said method further comprises:

rearranging the placement of information stored in the area of said nonvolatile storage; and wherein if said data has been deleted by said storing data step, then the placement of data stored behind said deleted data is rearranged according to said deleted data amount.

76. A recording medium according to claim 73, wherein said storing data step stores said key, said data, and said terminator immediately after a last terminator among said terminators stored in the area of said nonvolatile storage.

77. A recording medium according to claim 73 wherein said method further comprises:

detecting whether predetermined data exists in said data to be stored; and wherein if predetermined data is found among data to be stored, then said storing data step aborts storing data according to a result of said detection step.

78. A recording medium according to claim 73 wherein said method further comprises:

expanding a predetermined amount of print data received from said host device into a print buffer accommodating a plurality of lines, then printing the contents of said print buffer;

sequentially printing print data received from said host device; and selecting one of said expanding and sequentially printing steps in response to a command from said host device; and wherein said storing data step does not carry out the storing of said data if said expanding step has been selected according to a result of said selecting step.

79. A recording medium according to claim 73 wherein said method further comprises:

determining whether the amount of data specified by said first command is valid; and wherein said storing data step does not carry out the storing of said data if said data amount is not valid according to a result of said determining step.

80. A recording medium according to claim 73, wherein said method further comprises:

searching a key specified by said second command in an area of said nonvolatile storage; and wherein said reading data step reads and sends data in the area from said key specified in said second command to said terminator according to a result of said searching step.

81. A recording medium according to claim 80, wherein, if no data exists between said key and said terminator, then said reading data step sends a message indicating no data exists.

82. A recording medium according to claim 80, wherein, if said key specified by said second command does not exist, then said reading data step sends a message indicating no key exists according to a result of said searching step.

83. A recording medium according to claim 80, wherein, if said terminator does not exist, then said reading data step sends a message indicating no terminator exists.

84. A recording medium according to claim 80, wherein, if predetermined data is found among read data, then said reading data step sends a message indicating predetermined data is found.

85. A recording medium according to claim 73, wherein said method further comprises:

deleting data stored in said nonvolatile storage in response to a third command from said host device; and searching a key specified in said third command in the area of said nonvolatile storage; and wherein said deleting data step deletes data in the area from said key specified in said third command to said terminator according to a result of said searching step.

86. A recording medium according to claim 85, wherein said method further comprises:

rearranging the placement of information stored in the area of said nonvolatile storing means; and wherein if said data has been deleted by said deleting data step, then the placement of data stored behind said deleted data is rearranged according to said deleted data amount.

87. A recording medium according to claim 85 wherein said method further comprises:

expanding a predetermined amount of print data received from said host device into a print buffer accommodating a plurality of lines, then printing the contents of said print buffer;

sequentially printing print data received from said host device; and selecting one of said expanding and sequentially printing steps in response to a command from said host device;

wherein said storing data step does not delete said data if said expanding control step has been selected according to a result of said selecting step.

88. A recording medium according to claim 73, wherein said method further comprises:

an occupied-capacity detecting step for detecting and sending an occupied capacity in the area of said nonvolatile storing means in response to a third command from said host device.

89. A recording medium according to claim 73, wherein the method further comprises:

detecting a remaining capacity of the area of said nonvolatile storage and sending a remaining capacity indication in response to a fourth command from said host device.

90. A recording medium according to claim 73, wherein said method further comprises:

sending the capacity of the area of said nonvolatile storage in response to a fifth command from said host device.

91. A recording medium according to claim 73, wherein said method further comprises:

setting a code for authorizing the reading of said data in said first command; and comparing a code for reading said data specified in said second command with said code set in said first command; and wherein said reading data step performs the reading and sending of said stored data only if said code specified in said second command agrees with said code specified in said first command according to a result of said code-comparison step.

92. A recording medium according to claim 73, wherein:

said nonvolatile storage comprises a plurality of areas; and further comprising disabling one of the storing of data in at least one area of said plurality of areas of said nonvolatile storage and the reading of data from at least one area of said plurality of areas of said nonvolatile storage.

* * * * *

UNITED STATES PATENT AND TRADEMARK OFFICE
CERTIFICATE OF CORRECTION

PATENT NO.   : 6,244,762 B1
DATED        : June 12, 2001
INVENTOR(S)  : Kazuko Fukano et al.

It is certified that error appears in the above-identified patent and that said Letters Patent is hereby corrected as shown below:

<u>Column 16,</u>
Line 23, change "a" to -- as --.

Signed and Sealed this

Twenty-sixth Day of February, 2002

Attest:

Attesting Officer

JAMES E. ROGAN
*Director of the United States Patent and Trademark Office*